United States Patent [19]

Devimeux et al.

[11] Patent Number: 4,660,079
[45] Date of Patent: Apr. 21, 1987

[54] RECEIVING DEVICE IN AN ASYNCHRONOUS VIDEO INFORMATION TRANSMITTING SYSTEM

[75] Inventors: Daniel P. Y. Devimeux; Jean-Claude R. Jolivet, both of Paris, France

[73] Assignee: Societe Anonyme De Telecommunications, Paris, France

[21] Appl. No.: 662,594

[22] Filed: Oct. 19, 1984

[30] Foreign Application Priority Data

Oct. 21, 1983 [FR] France .................. 83 16768

[51] Int. Cl.[4] .................. H04N 7/04; H04N 7/08; H04N 7/093
[52] U.S. Cl. .................. 358/141; 358/12; 358/135; 358/142; 358/147; 358/260; 358/281; 340/347 DD; 375/25; 375/30; 375/31; 370/91
[58] Field of Search .................. 358/11, 12, 13, 85, 358/133, 135, 140, 141, 142, 146, 147, 260, 261, 281; 340/347 DD; 370/99, 102, 47, 91; 375/114, 25, 26, 27, 30, 31; 364/200, 900

[56] References Cited

U.S. PATENT DOCUMENTS

| | | | |
|---|---|---|---|
| 3,971,888 | 7/1976 | Ching et al. | 358/133 |
| 4,049,910 | 9/1977 | Jolivet et al. | 375/114 |
| 4,420,771 | 12/1983 | Pirsch | 358/133 |
| 4,509,038 | 4/1985 | Hirano | 340/347 DD |
| 4,568,916 | 2/1986 | Bahgat | 340/347 DD |

OTHER PUBLICATIONS

"Characteristics of Primary PCM Multiplex Equipment Operating at 2048 kbit/s", International Telegraph and Telephone Consultive Committee (CCITT) Recomendation G. 732, 1972, pp. 86-92.

"A Codec for Videoconferencing Using 2048 kbit/s Transmission", International Telegraph and Telephone Consultive Committee (CCITT), Contribution No. 134, Aug. 1982, pp. 1-12 with Addendums 1 and 2 of Oct. 1982.

Primary Examiner—James J. Groody
Assistant Examiner—Michael D. Parker
Attorney, Agent, or Firm—Laubscher & Laubscher

[57] ABSTRACT

This invention relates to digital transmission techniques whereby information produced in asynchronous form, for instance by variable-length coding and/or by conditional coding, is intended for transmission through a synchronous digital transmission path. More particularly, the invention concerns a receiving device comprising a picture buffer memory having a content that can be different from that of a picture buffer memory included in a transmitting device of the system, a circuit for detecting picture line and field synchronizations, a circuit for transcoding video information prior to its writing in the receiving device buffer memory and a circuit for monitoring writing and reading addresses in the buffer memory in terms of the detected synchronizations. A partial decoding of the video information is performed prior to entry in the receiving device buffer memory, and a synchronization of this memory is independent of the content in the transmitting device buffer memory.

11 Claims, 1 Drawing Figure

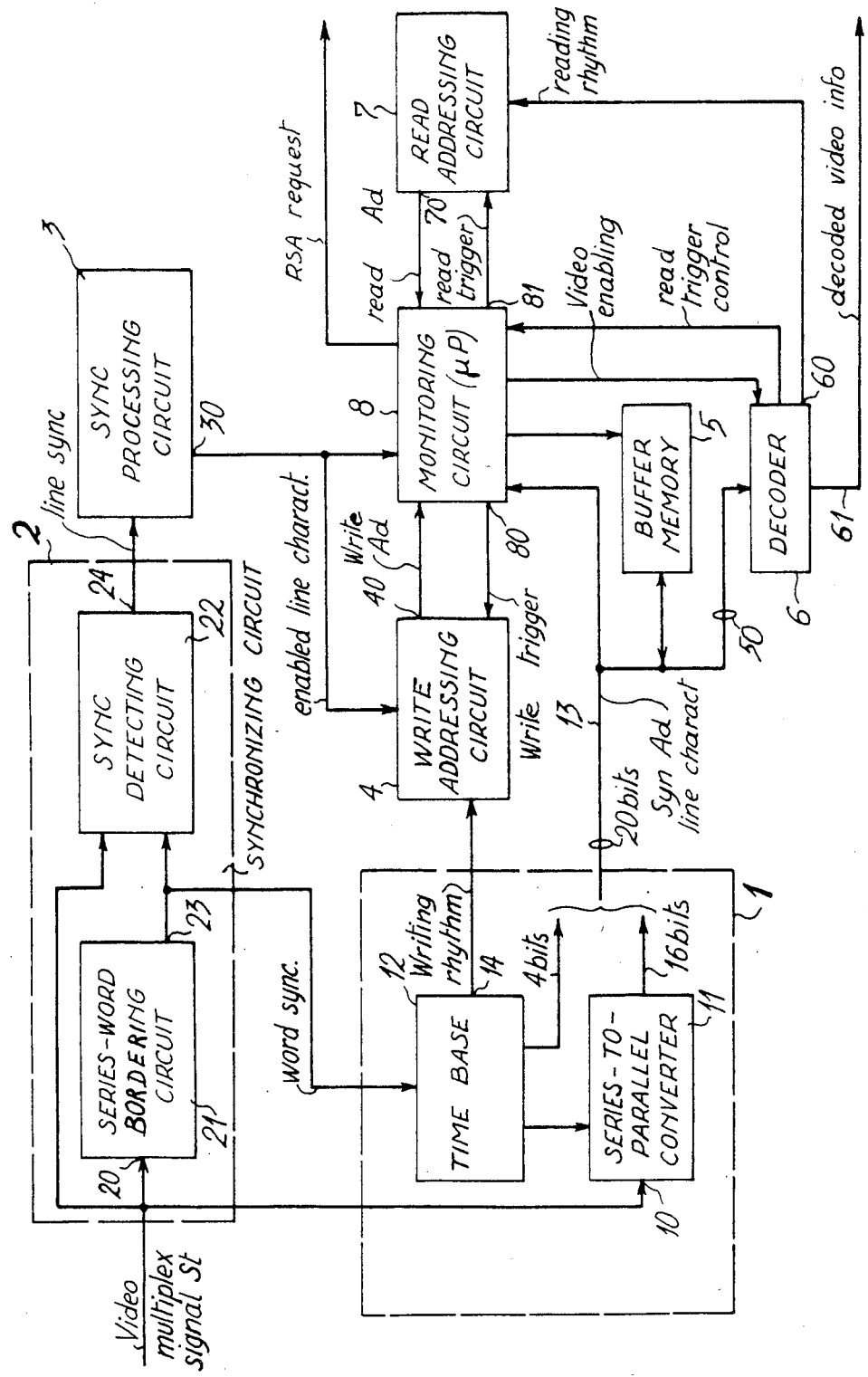

RECEIVING DEVICE IN AN ASYNCHRONOUS VIDEO INFORMATION TRANSMITTING SYSTEM

BACKGROUND OF THE INVENTION

1. Field of the Invention

The present invention relates to digital transmission techniques whereby information produced in asynchronous form, for instance by variable-length coding and/or by conditional coding, is intended for transmission through a synchronous digital transmission path.

Such techniques are applied in particular to a transmission of television pictures, videophone picturs, videoconference pictures, and the like.

2. Description of the Prior Art

Coded digital signals are usually transmitted in a digital path having a predetermined bit-rate by characterizing each sample through the use of a word carrying a fixed number of bits. However, when it comes to information requiring a high transmission binary rate such as in the picture information case in particular, there is every advantage in reducing the bit-rate by using a variable-length code in which a word carries fewer bits the more probable it is.

Likewise, the conditional replenishment codes make it possible to reduce the information bit-rate by transmitting only significant information, for instance on overstepping a threshold.

Contribution No. 134 from the CCITT (International Telegraph and Telephone Consultative Commitee) study group XV, August 1982 describes a codec for videoconferencing using 2048 kbit/s transmission and recommends a conditional replenishment method. This method consists essentially of transmitting solely the information that has changed from one picture to the next, where the information is transmitted using a variable-length coding.

A digital signal transmission system based on a variable-length coding has already been disclosed in U.S. Pat. No. 4,049,910. Information produced by an encoder appears at an irregular bit-rate and must be regulated by means of a buffer or "elastic" memory in order to be transmitted in a synchronous digital network. At a reception end, the information received at a synchronous bit-rate in a decoder must be recovered at a rhythm identical to that at which it was delivered. This operation is achieved by means of a buffer memory working usually in symmetry with that of the encoder.

A conventional decoding and synchronizing method such as that described in the aforementioned patent consists of writing in the reception buffer memory the information such as it is received, and of carrying out synchronization and decoding of the information at a buffer memory output. This method does however, display many drawbacks:

As far as line and field video synchronization is concerned, the decoding does not permit easy processing of synchronizing words to wipe out any faults introduced by transmission errors such as loss of line synchronization, or synchronizing word, or extra line.

Moreover, as regards variable-length decoding, if a maximum bit number per sample is equal to 10, as the signal reading rhythm in the buffer memory is 2.5 MHz in accordance with the aforementioned CCITT contribution, it is then necessary either to read the buffer memory with a bit-rate of 25 Mbit/s or to use an asynchronous permutator cumbersome to implement at a rhythm of 2.5 MHz.

What is more, as regards the information content stored in the transmission and reception buffer memories, exact symmetry is required which if not achieved entrains loss of information and extensive deterioration in recovered pictures.

OBJECTS OF THE INVENTION

The main object of this invention consists essentially of performing partial decoding of the information prior to entry in the reception buffer memory.

Another object of the invention consists of adopting a reception buffer memory synchronizing mode that is independent of the transmission buffer memory content.

SUMMARY OF THE INVENTION

Accordingly, there is provided a receiving device in an asynchronous digital video information transmitting system, the system comprising a transmitting device having a first buffer memory, and said receiving device comprising a second buffer memory the content of which can be different from that of the first memory.

Such a receiving device affords many advantages. First of all, line and field synchronizing operations are carried out before writing in the reception memory. The maximum proceesing frequency in then 2.048 MHz.

The receiving device embodying the invention comprises means for detecting picture line and field synchronizations, means for transcoding video information prior to its writing in the second buffer memory and means for monitoring writing and reading addresses in said second buffer memory in terms of said detected synchronizations.

DESCRIPTION OF THE DRAWING

Further objects, advantages and features of this invention will be apparent from the following description of several preferred embodiments with reference to the drawing appended hereto in which a sole FIGURE is a schematic block-diagram of an information receiving device in an asynchronous video information transmitting system.

BRIEF DESCRIPTION OF THE PREFERRED EMBODIMENTS

As mentioned in CCITT contribution No. 134, a digital videoconference signal is transmitted over a 2.048 Mbit/s digital path between a transmitting device and a receiving device in an asynchronous information system. The PCM videoconference signal is compatible in form with the frame structure defined in CCITT recommendation G.732. In other words, the videoconference signal is a multioplex video signal obtained by multiplexing 32 64 kbit/s channels. The 2.048 Mbit/s frame comprises two time slots TS0 and TS16 assigned to frame alignment and to signalling, one time slot for an audio channel and at least one time slot for a data channel. The other time slots are assigned to the digital video signal transmitting pictures after having undergone differential pulse code modulation (DPCM) and variable-length conditional replenishment encoding in the transmitting device.

Hereinafter, the interest is focused more particularly on the reception of asynchronous video information included in a multiplex video signal St obtained after separation of the signalling, audio and data channels.

The received multiplex video signal St is, in accordance with CCITT recommendation No. 134, composed of fixed-length words representing particularly line and picture field synchronizations, PCM (pulse code modulation) amplitudes, a position of a first picture element of moving area in each active line, and variable-length words having 2 to 10 bits for example, representing picture elements of moving areas in PCM code and transcoded into variable-length code.

The received signal St comprising all these words transmitted in series is fed to an input 10 of a transcoder 1. Transcoder 1 is formed essentially of a series-to-parallel converter 11 having an output delivering 16-bit parallel words. The 16-bit words correspond to inputting words after transcoding into fixed-length words. The 16-bit words are, in the illustrated embodiment, characteristics of the first picture element of each moving area represented by 8 bits indicating a corresponding amplitude in PCM code and 8 bits indicating the position of the first picture element. The 16-bit words may be fixed code words having 4 bits corresponding to two successive picture elements of the moving area, i.e. 8 bits occuped out of the 16 bits in the word. The 16-bit words may further design characteristics related to a last element of the moving area of each active line, referred to as area border element, coded by means of a fixed 4-bit code. Some 16-bit words may further be amplitudes in PCM code each represented by 8 bits and related to two successive elements transmitted to replenish the picture. Some 16-bit words may also represent characteristics of each active line indicating the coding mode, such as the number of quantization levels, or may represent a position of the following line synchronization in the digital signal. The above list of 16-bit words is not exhaustive and can be extended to other information provided the input information can be represented by fixed words comprising a maximum of 16 bits.

In parallel with the 16-bit fixed-length words, it is necessary to have additional characteristic words indicating the nature of the information contained in the fixed-length words. The format of these additional words is selected in terms of the nature of the fixed-length words to be characterized. The additional words apprise in particular as to whether the 16-bit words relate to a PCM or DPCM amplitude, an address, line synchronization, etc. The additional characterizing words carry P bits and are delivered by transcoder 1 in parallel with the 16-bit words in a bus 13. In a preferred embodiment, the number P of characterizing bits is limited to 4. The characterizing words are then as follows for each active line transmitted:

| | |
|---|---|
| DL1: | line start (line characteristics); |
| DL2: | following line start to be transmitted (following synchronizing address); |
| M8: | PCM amplitude and position of the first picture element in a moving area or a part of a moving area transmitted or PCM values of two successive picture elements; |
| 2d: | two words in DPCM code with 4 bits each; |
| EOC: | end of moving area; |
| EOC 1d: | 1 word in DPCM code for end of moving area; |
| FL: | line end; |
| FL 1d: | line end, word in 4-bit DPCM code. |
| CLY: | colour information border. |

After this, in the receiving device, the 16+4=20-bit words in bus 13 are written in a buffer memory 5 at an address supplied by a writing addressing circuit 4 operating in step with the appearance of the 20-bit words.

As already stated, the invention consists essentially of sequentially recovering video information received in the asynchronous mode at the initial rhythm prior to transmission and upon reception of carrying out transcoding on the video information received prior to its entry in the buffer memory of the receiving device. In reference to the FIGURE, the received video multiplex signal St is fed to input 10 of converter 11 in transcoder 1 as well as to an input 20 on a synchronizing circuit 2. Circuit 2 triggers and synchronizes transcoder 1 which, via input 10, receives the variable-length coded video signal and transforms the variable-length words into fixed-length words.

Transcoder 1 is synchronized by synchronization detecting device 2. Circuit 2 is essentially made up of a series word bordering circuit 21 and a line and field synchronization detecting circuit 22. Circuits 21 and 22 receive the video multiplex signal St via input 20. An output 23 of circuit 21 delivers a word synchronizing signal, on the one hand, to synchronization detecting circuit 22 and, on the one hand, to a time base 12 included in transcoder 1 in order to synchronize the transcoding operation in transcoder 1.

An output 24 of synchronization detecting circuit 22 delivers a line synchronizing signal that, for each line, is composed of a line synchronizing word having least significant bits indicating a line number in the picture. The line synchronizing signal is detected and processed by a synchronization processing circuit 3 that filters five consecutive line numbers thereby making it possible to eliminate false line synchronizations, to detect line synchronization loss and to correct erroneous line synchronizations. This can arise, for example, following errors through the transmitting path. The synchronization processing performed by circuit 3 consists thus primarily of examining a continuity in the line numbers over five consecutive lines and therefore introduces a delay of five lines in a line synchronization enabling as will be seen hereinafter.

In buffer memory 5, the actual video information in each line is marked at by the characteristics words DL1, DL2 and FL, DL1 and FL being line start and end pointers and DL2 including a writing address of the start of the following enabled line.

With this in mind, since the enabling of a line synchronization appears only after a 5-line delay as imposed by circuit 3, write addressing circuit 4 comprises a counter progressing at the 20-bit word writing rhythm supplied by an output 14 of time base 12, and a associated delay circuit for delaying the writing rhythm by 5 lines. The delay circuit stores the address position of counter circuit 4 upon write-in of each of the successive words DL1 and modifies the value of the writing address corresponding to a word DL1 by replacing it with the writing address delayed by 5 lines. In this fashion, the values of line start DL1 and DL2 can be stored in buffer memory 5 in appropriate memory cells.

Buffer memory 5 is able to store 64K words of 20 bits. Alternate write and read cycles of memory are each last 400 ns thereby making it possible to obtain an 8-bit word reading rhythm equal to 2.5 MHz.

A triggering of buffer memory 5 addressing and, consequently, the synchronization thereof are provided by a monitoring circuit 8. Monitoring circuit 8 comprises a microprocessor that monitors all the writing and reading operations per the picture fields and the content of buffer means 5.

Monitoring circuit 8 monitors the writing by receiving enabled line characterizing signals delivered by an output 30 of circuit 3 as well as a writing addressing signal delivered by an output 40 of circuit 4. An output 80 of circuit 8 provides circuit 4 with a write addressing triggering signal.

Likewise for reading, circuit 8 monitors the position of the reading address at the start of each line by means of a read addressing circuit 7 as well as the enabling of picture fields. In a fashion analogous to that of writing, an output 70 of read addressing circuit 7 delivers a read addressing signal to monitoring circuit 8 and an output 81 of circuit 8 delivers a read addressing triggering signal to circuit 7. The reading rhythm is supplied by an output 60 of a decoder 6 that advances a counter included in circuit 7. Decoder 6 decoders the video information read in buffer memory 5, via a bus 50, into decoded video information delivered by an output bus 61.

The value of the writing address for each field synchronization is stored in RAM memories in monitoring circuit 8. Depending on the number of fields in the memory and on the content of buffer memory 5, at each field start, monitoring circuit 8 restores the reading triggering address to the reading counter in addressing circuit 7 together with the enabling or disenabling of each picture field to decoder 6. This field enable or disenable corresponds, for example, to sub-sampling of one field out of two, picture hold, etc.

Buffer memory 5 is re-aligned independently of the content of the transmitting device (not shown) unlike the case of the prior art. In the received PCM digital frame, information indicates the content of the transmitting device buffer memory. The system based on the prior art make use of this information to re-align the buffer memory in the receiving device, with the effect then of generating upward overflow faults in a displayed picture.

The invention does not make use of this information on the content of the trnsmitter-end buffer memory but for reception video information re-alignment purposes uses a procedure quite specific to the invention, as described hereafter.

CCITT contribution No. 134 indicates that an encoder is the transmitting device, if it receives a particular order, must empty the content of the related buffer memory and then replenish the entire picture in accordance with a certain coding made, where this particular order is delivered by a device outside the codec.

The present invention uses this order and generates an accelerated replenishment RSA request signal from monitoring circuit 8 to the transmission encoder when buffer memory 5 is under the threat of being saturated. While waiting, the picture is "frozen", for an adjustable period of time. If at the end of this time, the expected picture has not arrived, picture jump occurs and the picture is replenished in a known way.

If on the other hand there is a risk of buffer memory 5 being completely empty, monitoring circuit 8 orders a halt on the picture being read and waits until there is at least one complete picture in memory 5 to stop the picture "freeze".

This monitoring organization of memory 5 thanks to monitoring circuit 8 has the effect, firstly, of doing away with the management of information on the transmission buffer memory content and the related drawbacks such as risks of errors resulting in deterioration in the event of transmission errors on the value of the content and, secondly, of ensuring system operation without introducing troublesome defects due to discrepancies between the contents of the transmission and reception buffer memories.

When reading of each line commences, monitoring circuit 8 extracts the address of the following enabled line synchronization address from input-output bus 13–50 of buffer memory 5. This address is then used at the start of each line to trigger the reading counter in addressing circuit 7 that then moves forwards at the decoder 6 rhythm.

Decoder 6, driven by a line and picture time-base, sequentially decodes the 4-bit characterizing word and, depending on the significance of this word, delivers the reading advance signal to circuit 7 in order to address buffer memory 5 in reading.

The 16-bit words outputting memory 5 are also decoded by decoder 6, and the moving areas are recovered in their initial form such as they had been detected.

It will thus be observed that with the receiving device embodying invention, the line and field synchronization operation are carried out before writing in buffer memory 5; the maximum processing frequency is then 2.048 MHZ. The pre-processing performed through circuits 3 and 4 on the line synchronizations makes it possible to consider in the buffer memory 5, reading-wise, only those lines for which the synchronizations have been enabled.

It will further be observed that the invention makes it possible to use a reception buffer memory 5 the content of which is not identical to that of the transmission buffer memory although the information transfer time between the transmission buffer memory input and the reception buffer memory 5 output is constant.

It would also be possible to choose fixed-length information words, said words comprising a number n of bits where n is a natural integer suiting the chosen application. Likewise, the characterizing words would be of fixed length formed of P bits, where P is also a natural integer, $2^P$ indicating then the number of configurations of the n-bit words.

What we claim is:

1. A receiving device in an asynchronous digital video information transmitting system for receiving a multiplex video signal including fixed-length words representative of picture line and field synchronizations and variable-length words representative of video information, comprising
    (a) means for detecting the picture line and field synchronization fixed-length words;
    (b) means connected with said detecting means for transcoding the video information variable-length words into video information fixed-length words;
    (c) a buffer memory for storing the transcoded video information; and
    (d) means controlled by said detecting means and connected with said transcoding means for monitoring the writing and reading addresses in said buffer memory in accordance with said detected synchronization fixed-length words.

2. Apparatus as defined in claim 1, wherein said transcoding means delivers in parallel with said video information fixed-length words, additional information fixed-length words comprising line start words and line end words characterizing said video information words.

3. Apparatus as defined in claim 2, wherein said monitoring means includes means connected with said transcoding means and controlled by said detecting means for writing into said buffer memory line said characterizing words and an enabled synchronization address of a following line responsive to each of said line start words.

4. Apparatus as defined in claim 2, wherein each of said video information fixed length words in combination with respective ones of said additional information fixed-length words has n bits, n being an integer.

5. Apparatus as defined in claim 4, wherein n equals 20.

6. Apparatus as defined in claim 4, wherein each of said characterizing words has P bits, $2^P$ being a number of configurations of n-bit fixed-length words, P being an integer.

7. Apparatus as defined in claim 6, wherein P equals 4.

8. Apparatus as defined in claim 3, wherein said monitoring means extracts said enabled synchronization address of said following line via an input-output bus of said buffer memory during reading of said line start word.

9. Apparatus as defined in claim 3, and further comprising means for extracting said line synchronization words prior to corresponding video information being written into said buffer memory, thereby reading video information words corresponding with enabled line synchronization words.

10. Apparatus as defined in claim 3, and further comprising a decoder for extracting said video information words from said buffer memory and for generating a reading control signal for addressing said buffer memory in accordance with the significance of said characterizing words.

11. Apparatus as defined in claim 1, wherein said monitoring means re-aligns said buffer memory in the event of saturation initially by a picture freeze and subsequently by deriving an accelerated replenishment requesting signal.

* * * * *